(12) United States Patent
Minagawa et al.

(10) Patent No.: US 9,884,246 B2
(45) Date of Patent: Feb. 6, 2018

(54) VIDEO GAME PROCESSING APPARATUS AND VIDEO GAME PROCESSING PROGRAM

(71) Applicant: KABUSHIKI KAISHA SQUARE ENIX, Tokyo (JP)

(72) Inventors: Hiroshi Minagawa, Shinjuku-ku (JP); Kazutoyo Maehiro, Shinjuku-ku (JP)

(73) Assignee: KABUSHIKI KAISHA SQUARE ENIX, Tokyo (JP)

( * ) Notice: Subject to any disclaimer, the term of this patent is extended or adjusted under 35 U.S.C. 154(b) by 215 days.

(21) Appl. No.: 14/174,316

(22) Filed: Feb. 6, 2014

(65) Prior Publication Data
US 2014/0228114 A1 Aug. 14, 2014

(30) Foreign Application Priority Data
Feb. 12, 2013 (JP) ................................ P2013-024448

(51) Int. Cl.
*G06F 3/03* (2006.01)
*A63F 13/00* (2014.01)
(Continued)

(52) U.S. Cl.
CPC .............. *A63F 13/00* (2013.01); *A63F 13/06* (2013.01); *A63F 13/10* (2013.01); *A63F 13/42* (2014.09);
(Continued)

(58) Field of Classification Search
CPC ... G06F 3/08; G06F 3/03; A63F 13/00; H04N 5/44543
See application file for complete search history.

(56) References Cited

U.S. PATENT DOCUMENTS

| 5,649,861 A * | 7/1997 | Okano | A63F 9/0291 |
| | | | 273/148 B |
| 2004/0139254 A1* | 7/2004 | Tu | G06F 3/0236 |
| | | | 710/73 |

(Continued)

FOREIGN PATENT DOCUMENTS

| JP | 2003-024634 | 1/2003 |
| JP | 2007-167326 A | 7/2007 |

(Continued)

OTHER PUBLICATIONS

David Snoddy, "The Legend of Zelda: The WindWaker (GameCube) Review—NintendoLife", Nintendo Life, XP055167157, URL: http://www.nintendolife.com/reviews/2007/04/legend_of_zelda_the_wind_waker_gamecube , Nov. 10, 2007.

(Continued)

*Primary Examiner* — James S McClellan
*Assistant Examiner* — Syvila Weatherford
(74) *Attorney, Agent, or Firm* — Greenblum & Bernstein, P.L.C.

(57) ABSTRACT

A video game processing apparatus for controlling progress of a video game is provided. An image display device is caused to display operating section images in an operating section image display area on a display screen in an arrangement pattern corresponding to arrangement positions of respective operating sections. The operating section images are operating section images respectively corresponding to the operating sections arranged in the operational input section. Identification display allowing a player to identify the operational function associated with the corresponding operating section is made for each of the group of operating section images. When to receive an operational input in response to an operation of any of the plurality of operating sections by the player, the video game processing apparatus (Continued)

carries out operation correspondence processing that indicates processing to exert an operational function associated with the operating section operated by the player.

9 Claims, 6 Drawing Sheets

(51) Int. Cl.
- *A63F 13/20* (2014.01)
- *A63F 13/40* (2014.01)
- *A63F 13/42* (2014.01)
- *A63F 13/422* (2014.01)
- *A63F 13/533* (2014.01)

(52) U.S. Cl.
CPC .......... *A63F 13/422* (2014.09); *A63F 13/533* (2014.09); *A63F 2300/6054* (2013.01); *G06F 3/03* (2013.01)

(56) References Cited

U.S. PATENT DOCUMENTS

| | | | |
|---|---|---|---|
| 2005/0215321 A1* | 9/2005 | Hussaini | A63F 13/06 463/37 |
| 2007/0155501 A1 | 7/2007 | Kanemori et al. | |
| 2008/0215981 A1* | 9/2008 | York | A63F 13/00 715/720 |
| 2008/0288878 A1* | 11/2008 | Hayashi | H04M 1/274525 715/762 |

FOREIGN PATENT DOCUMENTS

| | | |
|---|---|---|
| JP | 2007-222549 A | 9/2007 |
| JP | 2012-094085 | 5/2012 |

OTHER PUBLICATIONS

Search report from E.P.O., dated Feb. 12, 2015.
Japan Office action, dated May 26, 2015 along with a partial English translation thereof.
Enterbrain Inc., "Final Fantasy XIV: A Realm Reborn", Weekly Famitsu the Oct. 25, 2012, Oct. 11, 2012, pp. 156-157.
Enterbrain Inc., "Final Fantasy XIV: A Realm Reborn", Weekly Famitsu the Jul. 19, 2012, Jul. 5, 2012, pp. 130-133.
ASCII Media Works Inc., "Final Fantasy XIV: A Realm Reborn", Dengeki PlayStation the Oct. 25, 2012, Oct. 25, 2012, pp. 14-23.
Japanese Office Action issued in Japanese Patent Application No. 2015-203080 dated Mar. 21, 2017 with a partial English translation.
Office Action from Japanese Patent Office in Japanese Patent Application No. 2013-24448, dated Jun. 28, 2016, along with a partial English language translation.
Producer Naoki Yoshida and UI artist Hiroshi Minagawa, "FFXIV: A Realm Reborn" Interview (the first part), [online] GAME Watch, [search on Dec. 1, 2015]<URL: http://game.watch.impress.co.jp/docs/interview/20121011_565356.html>, along with a partial English language translation.
Office Action from Japanese Patent Office in Japanese Patent Application No. 2015-203080, dated Jul. 25, 2017, along with a partial English language translation.
Office Action from Japanese Patent Office in Japanese Patent Application No. 2015-203080, dated Oct. 24, 2017, along with a partial English language translation.
Kujira Blre, [TERA] Ghost Laboratory Solo Lv46 Lancer, YouTube, Feb. 9, 2013 from 2:00-3:00 (http://www.youtube.com/watch?v=0ebbYpKG_24).

* cited by examiner

Fig. 2

OPERATIONAL FUNCTION CORRESPONDENCE INFORMATION

| BUTTON NAME | | OPERATIONAL FUNCTION | |
| --- | --- | --- | --- |
| | | AT LEFT SETTING | AT RIIGHT SETTING |
| CROSS KEY | UPPER | ... | ... |
| | LOWER | ... | ... |
| | RIGHT | ... | ... |
| | LEFT | ... | ... |
| BUTTON GROUP | CIRCLE | ... | ... |
| | X | ... | ... |
| | TRIANGLE | ... | ... |
| | SQUARE | ... | ... |
| | | ... | ... |

Fig. 3

OPERATIONAL FUNCTION SETUP INFORMATION

| OPERATIONAL FUNCTION CORRESPONDENCE INFORMATION NAME | USAGE FLAG | SETUP FLAG (0: LEFT / 1: RIGHT) |
| --- | --- | --- |
| OPERATIONAL FUNCTION CORRESPONDENCE INFORMATION A | 1 | 0 |
| OPERATIONAL FUNCTION CORRESPONDENCE INFORMATION B | 0 | 0 |
| OPERATIONAL FUNCTION CORRESPONDENCE INFORMATION C | 0 | 0 |
| ⋮ | ⋮ | ⋮ |

VIDEO GAME PROCESSING APPARATUS AND VIDEO GAME PROCESSING PROGRAM

CROSS-REFERENCE TO RELATED APPLICATION

The present application relates to subject matter contained in Japanese Patent Application No. 2013-024448, filed on Feb. 12, 2013, the disclosure of which is expressly incorporated herein by reference in its entirety.

BACKGROUND OF THE INVENTION

1. Field of the Invention

The present invention relates to a video game processing apparatus and a video game processing program for controlling progress of a video game in response to an operation of a player.

2. Description of the Related Art

Heretofore, various types of video games have been proposed. In the proposed video games, it is common to control progress of a video game in response to an operation of a controller by a player (see Japanese Patent Application Publication No. 2007-167326 and Japanese Patent Application Publication No. 2007-222549, for example).

However, in the conventional video games, the player has been required to memorize a function of each of a plurality of buttons arranged on a controller. For this reason, there has been a problem that it is difficult for a beginner, in particular, to accurately operate the plurality of buttons and it is thus difficult for the beginner to play the video game smoothly.

SUMMARY OF THE INVENTION

The present invention has been made in order to solve the problem described above, and it is an object of the present invention to allow a player to carry out an operation of the player in a video game readily and smoothly.

In order to achieve the above object, in one aspect of the present invention, the present invention is directed to a video game processing apparatus for controlling progress of a video game in response to an operation of a player. The video game processing apparatus according to the present invention includes an operational function correspondence information memory for storing operational function correspondence information, a plurality of operating sections arranged in an operational input section being respectively associated with operational functions in the operational function correspondence information, each of the operational functions indicating a function of the corresponding operating section. The video game processing apparatus also includes an operating section image display controller for causing an image display device to display a group of operating section images in an operating section image display area on a display screen of the image display device in an arrangement pattern corresponding to arrangement positions of the respective operating sections, the group of operating section images being a plurality of operating section images respectively corresponding to the plurality of operating sections arranged in the operational input section, identification display being made for each of the group of operating section images, the identification display allowing the player to identify the operational function associated with the corresponding operating section.

The video game processing apparatus also includes an operational input receiver for receiving an operational input in response to an operation of any of the plurality of operating sections by the player.

The video game processing apparatus also includes an operation correspondence processor for carrying out operation correspondence processing in accordance with the operational input received by the operational input receiver, the operation correspondence processing indicating processing to exert an operational function associated with the operating section operated by the player.

By configuring the video game processing apparatus as described above, it is possible to allow the player to carry out an operation of the player in the video game readily and smoothly.

In the video game processing apparatus according to the present invention, it is preferable that the operational function correspondence information is information in which plural kinds of operational functions are associated with each of the plurality of operating sections. In this case, it is preferable that the video game processing apparatus further includes: an operational function switching request receiver for receiving a request to switch operational functions from the player; and an operational function switcher for switching setups of the operational function corresponding to each of the plurality of operating sections in response to the request to switch operational functions, wherein the operating section image display controller switches, in a case where the setups of the operational function are switched, the effective group of operating section images to be displayed in the operating section image display area into a group of operating section images for which identification display is made so as to allow the player to identify an operational function after switching.

In the video game processing apparatus according to the present invention, it is preferable that the operation correspondence processor carries out the operation correspondence processing in response to the operational input received by the operational input receiver, the operation correspondence processing indicating processing to exert any one operational function of plural kinds of operational functions associated with the operating section operated by the player.

In the video game processing apparatus according to the present invention, it is preferable that the operational function correspondence information is information in which a first operational function and a second operational function are associated with each of the plurality of operating sections; the operating section image display controller causes the image display device to display a first group of operating section images and a second group of operating section images in the operating section image display area together with effective group identification display, identification display that allows the player to identify the first operational function being made for the first group of operating section images, identification display that allows the player to identify the second operational function being made for the second group of operating section images, the effective group identification display allowing the player to identify which of the first and second groups of operating section images is effective; and the operating section image display controller switches display modes of the effective group identification display so that the player is allowed to identify the group of operating section images effective after switching in a case where the operational function switcher switches the setups of the operational function.

Moreover, in another aspect of the present invention, the present invention is directed to a non-transitory computer-readable medium including a video game processing program product for causing a computer to control progress of a video game in response to an operation of a player. In this case, the computer includes an operational function correspondence information memory for storing operational function correspondence information, a plurality of operating sections arranged in an operational input section being respectively associated with operational functions in the operational function correspondence information, each of the operational functions indicating a function of the corresponding operating section. The video game processing program product according to the present invention causes the computer to execute steps including causing an image display device to display a group of operating section images in an operating section image display area on a display screen of the image display device in an arrangement pattern corresponding to arrangement positions of the respective operating sections, the group of operating section images being a plurality of operating section images respectively corresponding to the plurality of operating sections arranged in the operational input section, identification display being made for each of the group of operating section images, the identification display allowing the player to identify the operational function associated with the corresponding operating section.

The steps also include receiving an operational input in response to an operation of any of the plurality of operating sections by the player.

The steps also include carrying out operation correspondence processing in accordance with the operational input received in the receiving an operational input, the operation correspondence processing indicating processing to exert an operational function associated with the operating section operated by the player.

According to the present invention, it is possible to allow the player to carry out an operation of the player in the video game readily and smoothly.

BRIEF DESCRIPTION OF THE DRAWINGS

The foregoing and other objects, features and advantages of the present invention will become more readily apparent from the following detailed description of a preferred embodiment of the present invention that proceeds with reference to the appending drawings:

FIG. 2 is an explanatory drawing showing an example of a storage state of operational function correspondence information;

FIG. 3 is an explanatory drawing showing an example of a storage state of operational function setup information;

DETAILED DESCRIPTION OF THE INVENTION

Hereinafter, an example of one embodiment according to the present invention will be described with reference to the appending drawings.

Figure 1:
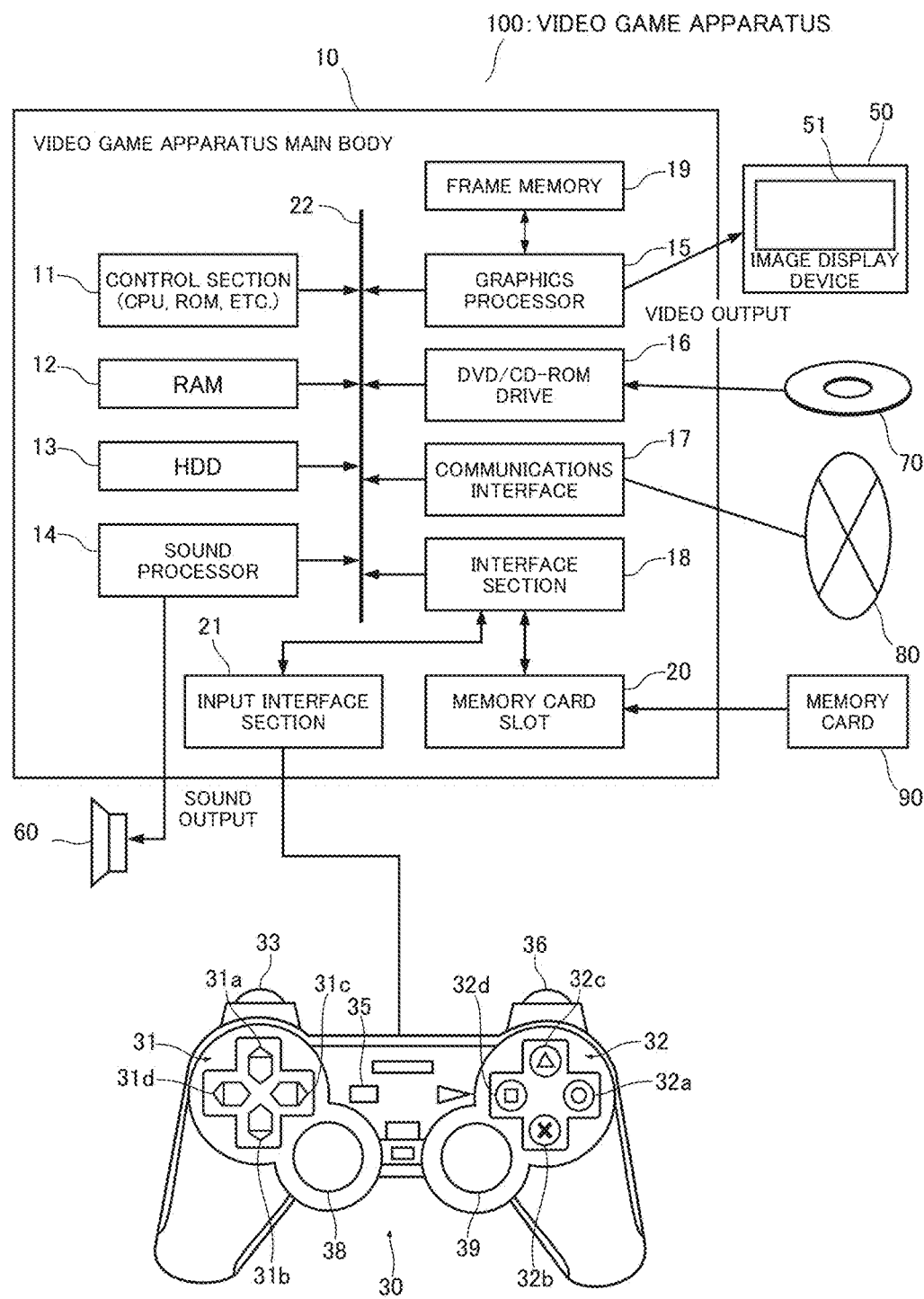
FIG. 1 is a block diagram showing a configuration example of a video game processing apparatus according to one embodiment of the present invention.

FIG. 1 is a block diagram that illustrates a configuration of a video game apparatus 100 to which an embodiment of the present invention is applied. As shown in FIG. 1, a video game apparatus 100 of the present embodiment includes a video game apparatus main body 10, an image display device 50, and a sound output device 60. The video game apparatus main body 10 is constituted from a video game system that is put on the market, for example. Further, the image display device 50 is constituted from, for example, a television apparatus, a liquid crystal display device, a micromirror device, a holographic display device, or any combination thereof. The image display device 50 is provided with an image display screen 51.

The video game apparatus main body 10 includes a control section 11, a RAM (Random Access Memory) 12, a HDD (hard disk drive) 13, a sound processor 14, a graphics processor 15, a DVD/CD-ROM drive 16, a communications interface 17, an interface section 18, a frame memory 19, a memory card slot 20, and an input interface section 21.

Each of the control section 11, the RAM (Random Access Memory) 12, the HDD (Hard Disk Drive) 13, the sound processor 14, the graphics processor 15, the DVD/CD-ROM drive 16, the communications interface 17 and the interface section 18 is connected to an internal bus 22.

The control section 11 includes a CPU (Central Processing Unit), ROM (Read Only Memory) and the like. The control section 11 executes control processes of the whole video game apparatus 100 in accordance with control programs (including a video game processing program) stored in the HDD 13 and/or a storage medium 70. The control section 11 includes an internal timer used to generate a timer interruption. The RAM 12 is used as a work area for the control section 11. The HDD 13 is a storage area for storing the control programs and various data.

The sound processor 14 is connected to a sound output device 60, which is configured by a speaker, for example. The sound processor 14 outputs a sound signal to the sound output device 60 in accordance with a sound outputting command from the control section 11 that executes a process according to the control programs. In this regard, the sound output device 60 may be embedded in the image display device 50 or the video game apparatus main body 10.

The graphics processor 15 is connected to the image display device 50 including the image display screen 51 on which an image is displayed. The graphics processor 15 develops an image on the frame memory 19 in accordance with a drawing or graphics command from the control section 11, and outputs video signals for displaying the image on the image display screen 51 to the image display device 50. A switching time for images to be displayed according to the video signals is set to $\frac{1}{30}$ seconds per frame (for NTSC type displays), for example.

A storage medium 70 such as a DVD-ROM medium or a CD-ROM medium, or equivalent, in which control programs for a video game are stored, is mounted in the DVD/CD-ROM drive 16. The DVD/CD-ROM drive 16 executes a process for reading out various data such as the control programs from the storage medium 70.

The communications interface 17 is connected to a communication network 80 such as the Internet, a local area network (LAN), a wide area network (WAN), or the like, in a wireless or wired manner. The video game apparatus main body carries out communication with, for example, another computer via the communication network 80 using a communication function of the communications interface 17.

Each of the input interface section 21 and the memory card slot 20 is connected to the interface section 18. The interface section 18 causes instruction data from the input interface section 21 to be stored in the RAM 12 on the basis of operation (s) of a keypad 30 by a player of the video game apparatus 100. In response to the instruction data stored in the RAM 12, the control section 11 then executes various arithmetic processing.

The video game apparatus main body 10 is connected to the keypad 30 as an operational input section (controller) via the input interface section 21.

As shown in FIG. 1, a cross key 31, a group of buttons 32, a left joystick 38 and a right joystick 39 are arranged on the upper surface of the keypad 30. The cross key 31 includes an upper key 31*a*, a lower key 31*b*, a right key 31*c* and a left key 31*d*. The group of buttons 32 includes a circle button 32*a*, an X button 32*b*, a triangle button 32*c* and a square button 32*d*. Further, a select button 35 is arranged at a connecting portion between a base on which the cross key 31 is arranged and a base on which the group of buttons 32 is arranged. In this regard, a plurality of buttons such as an R1 button 36 and an L1 button 33 are arranged at the side surface of the keypad 30.

The keypad 30 is provided with multiple switches respectively connected to the cross key 31, the circle button 32*a*, the X button 32*b*, the triangle button 32*c*, the square button 32*d*, the select button 35, the start button 37, the R1 button 36 and the L1 button 33. When a pressing force is applied to any button (that is, when any button is operated), the corresponding switch is turned on. A detected signal in accordance with on/off of the switch is generated in the keypad 30, and detected signals are generated, respectively, corresponding to inclined directions of the left joystick 38 and the right joystick 39 in the keypad 30.

The two types of detected signals generated in the keypad 30 are supplied to the control section 11 via the input interface section 21 (through wired or wireless connection), by which detected information indicating that any button on the keypad 30 is pressed and detected information indicating the state of each of the left joystick 38 and the right joystick 39 are generated. In this way, operation instruction(s) by a player using the keypad 30, for example, is supplied to the video game apparatus main body 10 (that is, the control section 11).

Further, the interface section 18 carries out, in accordance with the command(s) from the control section 11, a process to store data indicative of a progress status of the video game stored in the RAM 12 into the memory card 90 installed in the memory card slot 20. The interface section 18 also carries out a process to read out data on the video game stored in the memory card 90 at the time of suspending the video game and a process to transfer such data to the RAM 12, and the like.

Various data, such as the control programs for carrying out the video game in the video game apparatus 100, are stored in the storage medium 70, for example. The various data, such as the control programs stored in the storage medium 70, are read out by the DVD/CD-ROM drive 16 in which the storage medium 70 is installed. The data thus read out are loaded onto the RAM 12. The control section 11 executes, in accordance with the control program loaded on the RAM 12, various processes such as a process to output the drawing or graphics command to the graphics processor 15 and a process to output the sound outputting command to the sound processor 14. In this regard, the interim data intermediately generated in response to the progress status of the video game (for example, data indicative of scoring of the video game, the state of a player character and the like) are stored in the RAM 12 used as a work memory while the control section 11 executes the processing.

In the present embodiment, operational function correspondence information and operational function setup information are contained in the data recorded in the storage medium 70 and loaded onto the RAM 12. FIG. 2 is an explanatory drawing showing an example of a storage state of the operational function correspondence information. FIG. 3 is an explanatory drawing showing an example of a storage state of the operational function setup information.

The operational function correspondence information is information in which a button name of each button of the cross key 31 and the group of buttons 32 arranged on the keypad 30 is associated with an operational function of the corresponding button, for example, as shown in FIG. 2. In the present embodiment, as shown in FIG. 2, there are two kinds of functions according to setup as the operational function of each button. The two kinds of functions includes a function exerted at left setting and a function exerted at right setting. Plural kinds of operational function correspondence information are prepared in the present embodiment, and are switched and used in accordance with scenes in the video game. Further, an image (that is, an operating section image; which will be described later) according to each operational function is defined in the present embodiment. In the operational function correspondence information, image information indicating an operating section image is stored so as to correspond to each operational function.

The operational function setup information contains: a name of the operational function correspondence information: a usage flag indicating whether the corresponding operational function correspondence information is effective or not; and a setup flag indicating which operational function is set up, for example, as shown in FIG. 3. The operational function correspondence information whose usage flag is turned on (in the present embodiment, set up to "1") is operational function correspondence information that is effective (or used) in the video game. Further, the operational function indicated by the setup flag in the operational function correspondence information whose usage flag is turned on indicates currently effective. More specifically, when the setup flag is set to "0", the operational function at left setting indicates effective. On the other hand, when the setup flag is set to "1", the operational function at right setting indicates effective.

Next, an operation of the video game apparatus 100 according to the present embodiment will be described. In this regard, the content and processing with no relationship to the present invention may be omitted.

Figure 4:
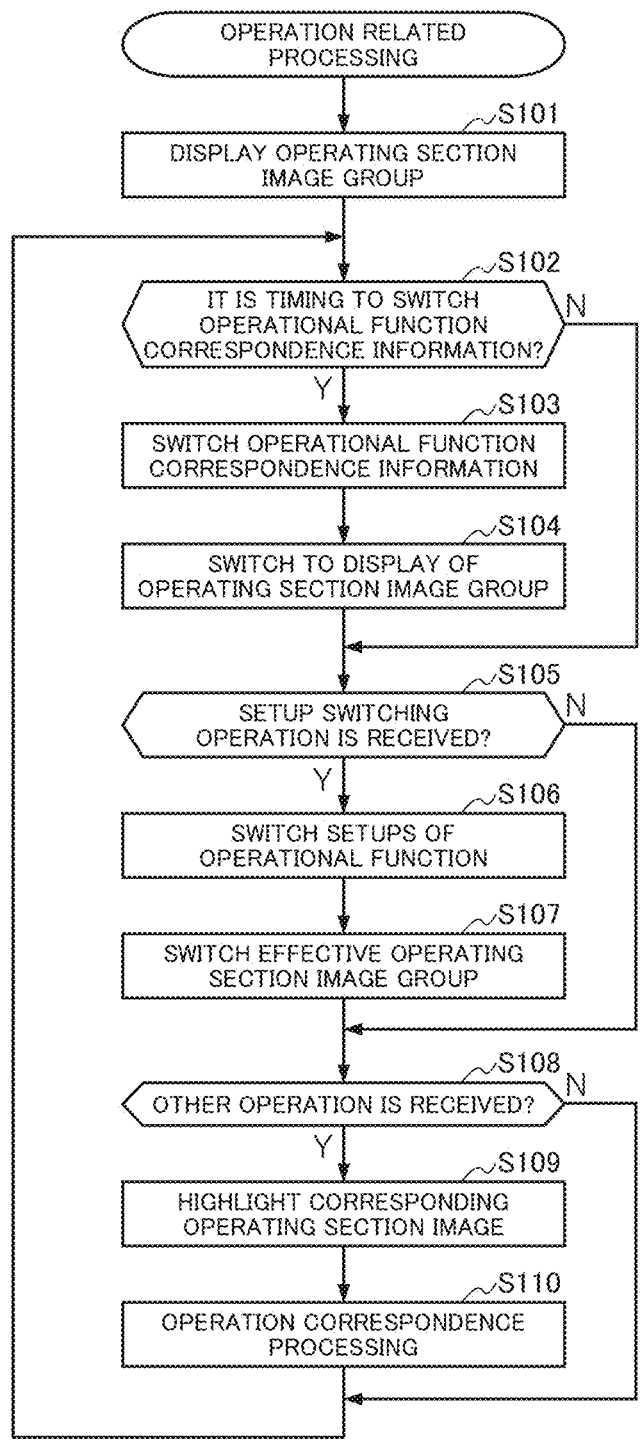
FIG. 4 is a flowchart showing an example of operation related processing.

FIG. 4 is a flowchart showing an example of operation related processing carried out by the video game apparatus 100. In the operation related processing, various kinds of processes in response to operations of the keypad 30 by a player X are carried out.

The operation related processing is started when the video game is started or a stage or scene in the video game is changed, for example. Here, the operation related processing is started in a case where the scene is changed into a battle scene in the present embodiment.

In the operation related processing, the video game apparatus 100 first specifies operational function correspondence information to be used in accordance with a current progress status of the video game, a current scene and the like; and causes the display device 50 to display a group of operating section images (that is, an operating section image group) indicated by the specified operational function correspondence information on the image display screen 51 (Step S101). The operational function correspondence information used for each progress status or each scene is defined in advance. At Step S101, the video game apparatus 100 refers to the operational function setup information, and turns on the usage flag of the specified operational function correspondence information on. The video game apparatus 100 then refers to the operational function correspondence information to be used, and causes the image display device 50 to display the operating section image group. Here, the video game apparatus 100 specifies an operating section image group whose operational function is set to effective by the setup flag of the operational function setup information (in this regard, an initial setup is zero), and distinguishably display the specified operating section image group as the effective operating section image group.

Figure 5:
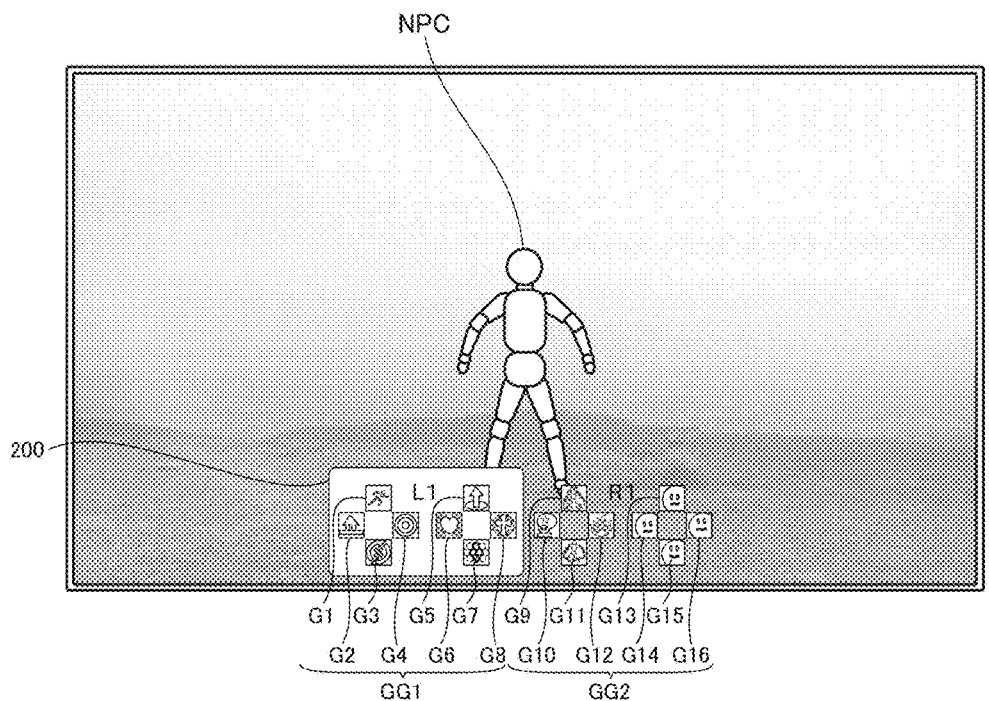
FIG. 5 is an explanatory drawing showing an example of a game screen.

FIG. 5 is an explanatory drawing showing an example of a game screen on which an operating section image group is displayed. In the present embodiment, an enemy character NPC; a first operating section image group GG1; a second operating section image group GG2; an effective group identifying frame 200 for identifying which operating section image group is effective; are displayed on the game screen, for example, as shown in FIG. 5. In the example shown in FIG. 5, the first operating section image group GG1 and the second operating section image group GG2 are displayed in an operating section image display area provided at a lower area of the game screen, and the first operating section image group GG1 enclosed by the effective group identifying frame 200 becomes an effective state.

The "operating section image" is an image corresponding to each of the plurality of operating sections (in the present embodiment, the upper key 31*a*, the lower key 31*b*, the right key 31*c*, the left key 31*d*, the circle button 32*a*, the X button 32*b*, the triangle button 32*c* and the square button 32*d*) arranged on the keypad 30, and means an image in which identification display allowing the player X to identify an operational function associated with the corresponding operating section is made. A figure (or a mark) by which the player X is allowed to identify the corresponding operational function is displayed in each of the operating section images. In the example shown in FIG. 5, the video game apparatus 100 is configured so that the player X can directly or indirectly identify an operational function by means of its figure. However, it is not limited to the figure. The video game apparatus 100 may be configured so that the player X can directly or indirectly identify the operational function by means of characters or symbols, for example.

Further, the "group of operating section images (or the operating section image group)" means an image in which the respective operating section images are displayed in an arrangement pattern corresponding to arrangement positions of the corresponding operating sections (in the present embodiment, the upper key 31*a*, the lower key 31*b*, the right key 31*c*, the left key 31*d*, the circle button 32*a*, the X button 32*b*, the triangle button 32*c* and the square button 32*d*).

In the example shown in FIG. 5, the first operating section image group GG1 and the second operating section image group GG2 are displayed. The first operating section image group GG1 is configured by: an operating section image G1 corresponding to the upper key 31*a*; an operating section image G3 corresponding to the lower key 31*b*; an operating section image G4 corresponding to the right key 31*c*; an operating section image G2 corresponding to the left key 31*d*; an operating section image G8 corresponding to the circle button 32*a*; an operating section image G7 corresponding to the X button 32*b*; an operating section image G5 corresponding to the triangle button 32*c*; and an operating section image G6 corresponding to the square button 32*d*. Further, the second operating section image group GG2 is configured by: an operating section image G9 corresponding to the upper key 31*a*; an operating section image G11 corresponding to the lower key 31*b*; an operating section image G12 corresponding to the right key 31*c*; an operating section image G10 corresponding to the left key 31*d*; an operating section image G16 corresponding to the circle button 32*a*; an operating section image G15 corresponding to the X button 32*b*; an operating section image G13 corresponding to the triangle button 32*c*; and an operating section image G14 corresponding to the square button 32*d*.

In the present embodiment, the video game apparatus 100 carries out processing to distinguishably display which operating section image group of two types of operating section image groups including the first operating section image group GG1 and the second operating section image group GG2 is effective at Step S101 as shown in FIG. 5.

Next, the video game apparatus 100 confirms whether it is timing to switch the operational function correspondence information or not (Step S102). Ina case where it is confirmed that it is the timing to switch, the video game apparatus 100 carries out processing to switch the operational function correspondence information to be used (that is, processing to switch a usage flag of the corresponding operational function correspondence information) (Step S103), and carries out processing to switch to a display of the group of operating section images (the operating section image group) indicated by the switched operational function correspondence information (Step S104). In this regard, the timing to switch the operational function correspondence information and operational function correspondence information newly used due to the switching are defined in advance.

Next, the video game apparatus 100 confirms whether a setup switching operation for the operational function by the player X is received or not (Step S105). The setup switching operation for the operational function is carried out by an operation of the L1 button 33 and the R1 button 36 arranged on the keypad 30 in the present embodiment. More specifically, an operation of the L1 button 33 causes the video game to switch into the operational function indicated by the operating section image group GG1 that is displayed at the left side of the game screen. On the other hand, an operation of the R1 button 36 causes the video game to switch into the operational function indicated by the operating section image group GG2 that is displayed at the left side of the game screen.

Figure 6:
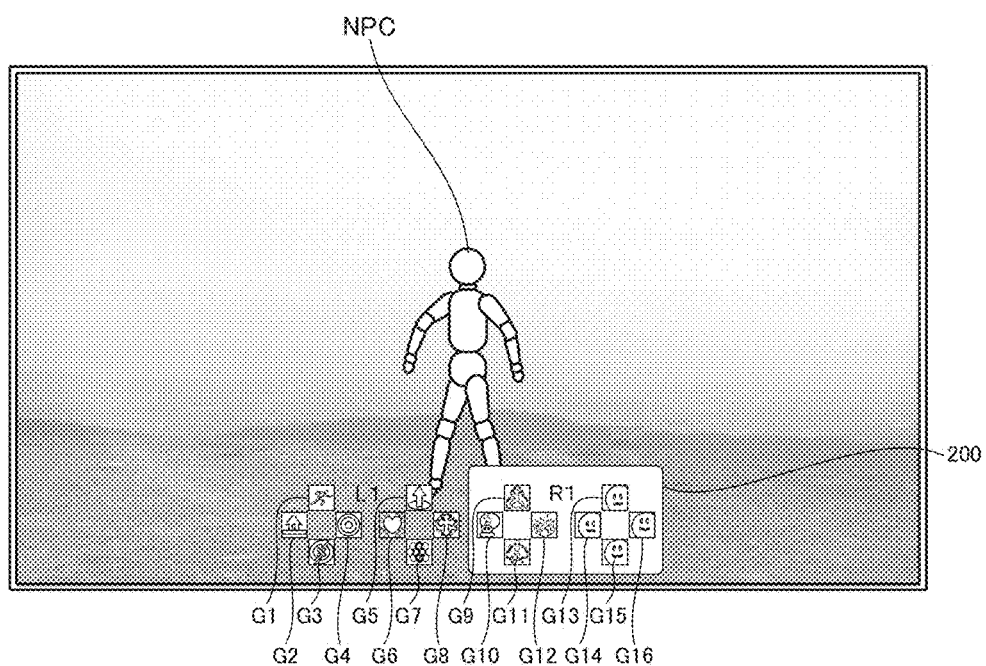
FIG. 6 is an explanatory drawing showing another example of the game screen.

In a case where it is confirmed that the setup switching operation for the operational function is received, the video game apparatus 100 switches setups of the operational function by switching the setup flag of the corresponding operational function correspondence information in the operational function setup information (Step S106). In order to inform the player X that the operational function specified by the setup flag of the operational function correspondence information, the video game apparatus 100 switches an effective operating section image group by switching a display position of the effective group identifying frame 200 (Step S107). More specifically, in a case where the R1 button 36 is pressed from the state shown in FIG. 5, for example, the video game apparatus 100 causes the image display device 50 to display the effective group identifying frame 200, which has been displayed at a position so as to enclose the first operating section image group GG1 as shown in FIG. 5, at a position so as to enclose the second operating section image group GG2 as shown in FIG. 6. Thus, the video game apparatus 100 informs the player X that the effective operating section image group is switched from the first operating section image group GG1 to the second operating section image group GG2.

Next, the video game apparatus 100 confirms whether an operation other than the setup switching operation for the operational function by the player X is received or not (Step S108). In the present embodiment, the video game apparatus 100 confirms whether an operation of the operating section other than the L1 button 33 and the R1 button 36 of the operating section arranged on the keypad 30 is received or not.

Figure 7:
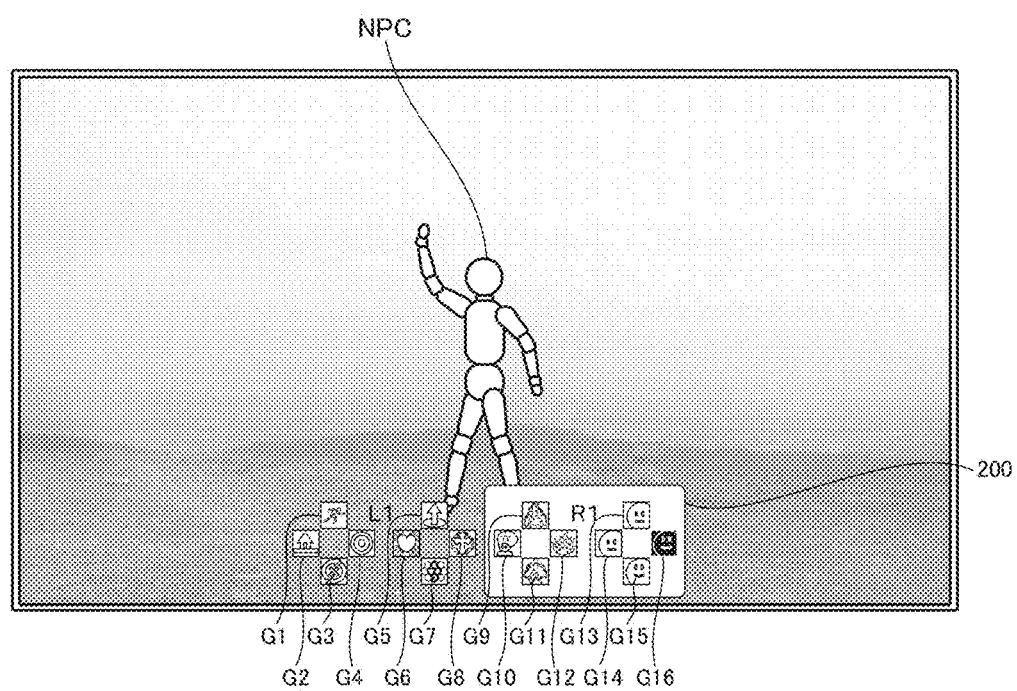
FIG. 7 is an explanatory drawing showing still another example of the game screen.

In a case where an operation other than the setup switching operation for the operational function is received and the operation is an operation for the operating section whose corresponding operating section image is displayed, the video game apparatus 100 highlights the corresponding operating section image (for example, reversing display, display in which color is changed, enlarged display, and the like) (Step S109), and carries out processing according to the operation set up in the operational function correspondence information (operation correspondence processing) (Step S110). FIG. 7 is an explanatory drawing showing an example of the game screen of the case where an operation of the circle button 32*a* is received when the second operating section image group GG2 is effective and the corresponding the operating section image G16 is highlighted.

By configuring the video game apparatus 100 as described above, the player X is allowed to readily and accurately recognize the operational function of each operating section by means of its operating section image of the operating section image group, whereby the player X can operate an appropriate operating section. Further, the player X can select one operating section image group to be effective from the among a plurality of operating section image groups each of whose operational function associated with the corresponding operating section is different from each other by switching operating section image groups to be effective among the plurality of operating section image groups by means of the setup switching operation for the operational function. For that reason, the player X can readily and accurately carry out each operation to exert many operational functions more than the number of operating sections by means of the operating sections arranged on the keypad 30.

Figure 8:
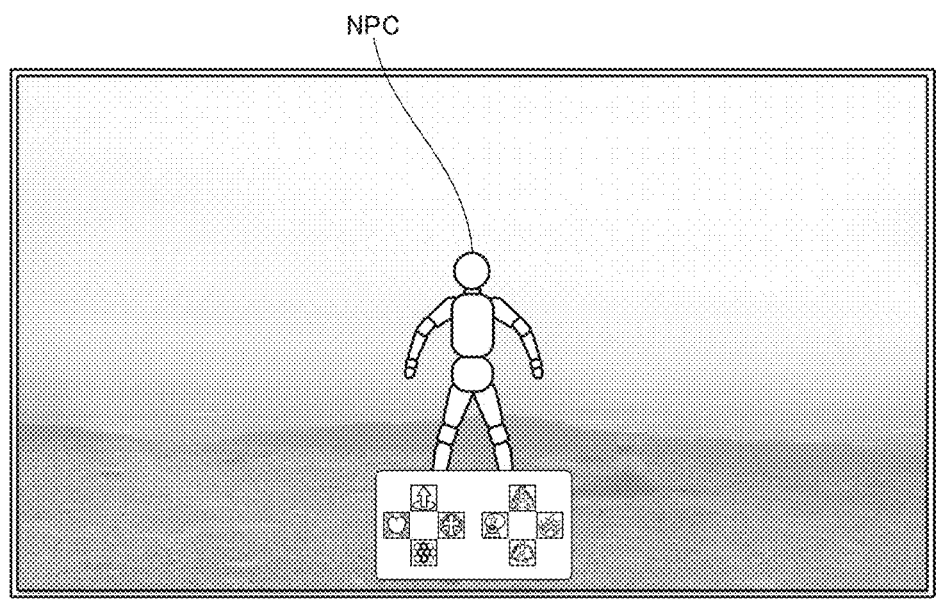
FIG. 8 is an explanatory drawing showing still another example of the game screen.
Figure 9:
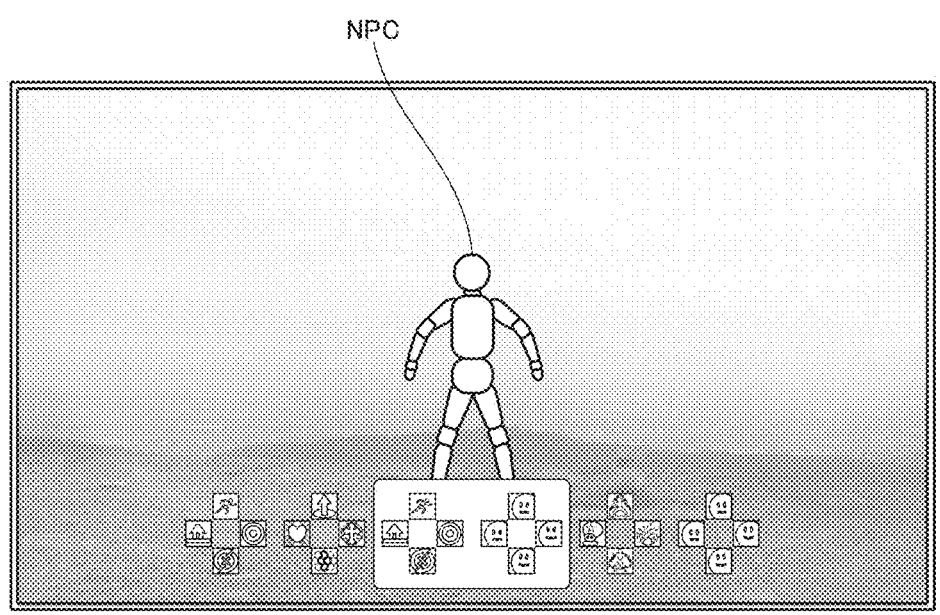
FIG. 9 is an explanatory drawing showing still another example of the game screen.

In this regard, the video game apparatus 100 is configured so as to specify an effective operating section image group by switching the two types of operating section image groups in the embodiment described above. However, as shown in FIG. 8, the video game 100 may be configured so as to use one operating section image group. Further, as shown in FIG. 9, the video game 100 may be configured so as to specify an effective operating section image by switching three types of operating section image groups using the similar processing. Moreover, the video game 100 may be configured so as to specify an effective operating section image by switching four types or more of operating section image groups using the similar processing.

Further, in the embodiment described above, the video game apparatus 100 is configured so as to: display the two types of operating section image groups; and allow the player to specify an effective operating section image group by means of a display position of the effective group identifying frame 200. However, the video game apparatus 100 may be configured so as to display only the effective operating section image group. In this case, the video game apparatus 100 may switch an operating section image group to be displayed in response to the setup switching operation of the operational function by the player.

As explained above, in the embodiment described above, the video game apparatus (the video game apparatus 100 and the video game apparatus main body 10) for controlling progress of a video game in response to an operation of the player is configured so as to: include the RAM 12 for storing operational function correspondence information (see FIG. 2), a plurality of operating sections (that is, the upper key 31*a*, the lower key 31*b*, the right key 31*c*, the left key 31*d*, the circle button 32*a*, the X button 32*b*, the triangle button 32*c* and the square button 32*d*) arranged in an operational input section (for example, the keypad 30) being respectively associated with operational functions in the operational function correspondence information, each of the operational functions indicating a function of the corresponding operating section; cause the image display device 50 to display a group of operating section images in an operating section image display area on the display screen 51 of the image display device 50 in an arrangement pattern corresponding to arrangement positions of the respective operating sections, the group of operating section images being a plurality of operating section images respectively corresponding to the plurality of operating sections arranged in the operational input section, identification display being made for each of the group of operating section images, the identification display allowing the player to identify the operational function associated with the corresponding operating section; receive an operational input in response to an operation of any of the plurality of operating sections by the player; and carry out operation correspondence processing in accordance with the operational input received by the operational input receiver, the operation correspondence processing indicating processing to exert an operational function associated with the operating section operated by the player. Therefore, it is possible to allow the player to carry out an operation of the player in the video game readily and smoothly.

Namely, in the embodiment described above, the group of operating section images for which identification display is made for allowing the player to identify the corresponding operational function are displayed in the arrangement pattern corresponding to arrangement positions of the respective operating sections. Therefore, the player, even a beginner of the video game, can carry out an operation of the operating section readily and accurately while watching the group of operating section images. For this reason, the player can carry out his or her operation in the video game readily and smoothly.

Further, in the embodiment described above, the video game apparatus (the video game apparatus 100 and the video game apparatus main body 10) is configured so that the operational function correspondence information is information in which plural kinds of operational functions are associated with each of the plurality of operating sections; and so as to receive a request to switch operational functions from the player; switch setups of the operational function corresponding to each of the plurality of operating sections in response to the request to switch operational functions; and, in a case where the setups of the operational function are switched, switch the effective group of operating section images to be displayed in the operating section image display area into a group of operating section images for which identification display is made so as to allow the player to identify an operational function after switching. Therefore, the player is allowed to select one operating section image group to be effective from among the plurality of operating section image groups each of whose operational function associated with the corresponding operating section is different from each other. For that reason, the player X can readily and accurately carry out each operation to exert many operational functions more than the number of operating sections by means of the operating sections arranged on the operational input section.

Further, in the embodiment described above, the video game apparatus (the video game apparatus 100 and the video game apparatus main body 10) is configured so as to carry out the operation correspondence processing in response to the received operational input, the operation correspondence processing indicating processing to exert any one operational function of plural kinds of operational functions associated with the operating section operated by the player. Therefore, it is possible to readily and accurately carry out each operation to exert many operational functions more than the number of operating sections by means of the operating sections arranged on the operational input section.

Further, in the embodiment described above, the video game apparatus (the video game apparatus 100 and the video game apparatus main body 10) is configured so that the operational function correspondence information is information in which a first operational function and a second operational function are associated with each of the plurality of operating sections. The video game processing apparatus is also configured so as to: causes the image display device to display a first group of operating section images and a second group of operating section images in the operating section image display area together with effective group identification display (for example, the effective group identifying frame 200), identification display that allows the player to identify the first operational function being made for the first group of operating section images, identification display that allows the player to identify the second operational function being made for the second group of operating section images, the effective group identification display allowing the player to identify which of the first and second groups of operating section images is effective; and switch display modes of the effective group identification display (for example, switch display positions of the effective group identifying frame 200) so that the player is allowed to identify the group of operating section images effective after switching in a case where the operational function switcher switches the setups of the operational function. Therefore, the player can readily and accurately carry out the operation to exert many types of operational functions while watching the two types of operating section image groups displayed in the operating section image display area and switching the two types of operating section image groups.

In this regard, the video game apparatus 100 is configured so as to be provided with the display device 50, the keypad 30 and the like at the outside of the video game apparatus 100 in the embodiment described above. However, it goes without saying that the present invention can be applied to a video game apparatus including a display device and a controller at the inside thereof.

INDUSTRIAL APPLICABILITY

The present invention is useful to allow a player to carry out an operation of the player in a video game readily and smoothly.

What is claimed is:

1. A video game processing apparatus for controlling progress of a video game in response to an input received from a player, the video game processing apparatus comprising:
   a memory configured to store operational correspondence information, the operational correspondence information including a relationship of a plurality of inputs arranged on one input device with a plurality of gameplay operations, each of the gameplay operations corresponding to an input of the one input device, and at least one of the inputs of the one input device corresponding to two or more gameplay operations;
   a display controller configured
      to control an image display device to simultaneously display, on a display screen of the image display device, a plurality of virtual image sets including at least a first virtual image set and a second virtual image set, the plurality of virtual image sets corresponding to the one input device, each virtual image set having a plurality of virtual images each corresponding to a gameplay operation executable by an input of the one input device, the first virtual image set corresponding to a first set of gameplay operations and the second virtual image set corresponding to a second set of gameplay operations, such that an input of the one input device executes, at a time, one of a gameplay operation of the first set of gameplay operations or a gameplay operation of the second set of gameplay operations, and
      to control the image display device to distinguishably display an active set of the virtual images among at least the first virtual image set and the second virtual image set to allow identification of active gameplay operations associated with the corresponding input, wherein only one of the plurality of virtual image sets being activated at a time according to a selection by the player;
   an input receiver configured to receive, from the player, a selection of the input of the one input device; and
   a processor configured to execute a gameplay operation corresponding to the selection of the input received by the input receiver, the gameplay operation being executed corresponding to the active set of the virtual images but not an inactive set of virtual images,
   wherein each of the plurality of virtual image sets is different,
   wherein each of the virtual images of the plurality of virtual image sets includes an image indicative of a gameplay operation that is executable during a gameplay,
   wherein only one of the plurality of virtual image sets is set as the active set of virtual images at a time using a switching operation executed by the one input device,
   wherein the switching operation is executed during the gameplay.

2. The video game processing apparatus according to claim 1, wherein the operational correspondence information includes a relationship between plural kinds of gameplay operations and each of the plurality of inputs,
   wherein the video game processing apparatus further comprises:
      a gameplay operation switching request receiver configured to receive, from the player, a request to switch the gameplay operations; and
      a gameplay operation switcher configured to switch setups of the gameplay operations corresponding to each of the plurality of inputs in response to the request to switch the gameplay operations, and wherein the display controller controls the image display device, when the setups of the gameplay operations are switched, to distinctively display the active set of virtual images corresponding to the switched gameplay operations in the display area among the plurality of virtual image sets to allow the player to identify active gameplay operations after the switch of the setups of the gameplay operations.

3. The video game processing apparatus according to claim 2, wherein the processor is further configured to execute a game play operation of the plural kinds of game play operations in response to the selection of the input received by the input receiver, the gameplay operation to be executed being associated with the input selected by the player.

4. The video game processing apparatus according to claim 2, wherein the operational correspondence information includes a relationship of a first gameplay operation and a second gameplay operation with the input of the one input device, wherein the display controller controls the image display device to indicate which of the plurality of virtual image sets is active to allow the player to identify when the first gameplay operation being made for the first virtual image set among the plurality of virtual image sets, and when the second gameplay operation being made for the second virtual image set among the plurality of virtual image sets, and wherein the display controller switches display modes to indicate which of the first and second virtual image set is active when the gameplay operation switcher switches the setups of the gameplay operations.

5. The video game processing apparatus according to claim 1, wherein at least one of the gameplay operations differs between the first set of gameplay operations and the second set of gameplay operations.

6. The video game processing apparatus according to claim 1, wherein a number of gameplay operations that can be configured to be executed by the inputs of the one input device is greater than a number of the inputs.

7. The video game processing apparatus according to claim 1, wherein one of the first and second virtual image sets is selected, among the plurality of virtual image sets displayed on the display device, to be set as the active set of virtual images.

8. The video game processing apparatus according to claim 1, wherein an operation flag is turned on for gameplay operations corresponding to the active set of the virtual images, and an operation flag is turned off for gameplay operations corresponding to the inactive set of virtual images.

9. A non-transitory computer-readable medium including a video game processing program product for causing a computer to control progress of a video game in response to an operation of a player, wherein the computer comprises a memory configured to store operational correspondence information, the operational correspondence information including a relationship of a plurality of inputs arranged on one input device with a plurality of gameplay operations, each of the gameplay operations corresponding to an input of the one input device, and at least one of the inputs of the one input device corresponding to two or more gameplay operations, wherein the video game processing program product causes the computer to execute:

controlling an image display device to simultaneously display, on a display screen of the image display device, a plurality of virtual image sets including at least a first virtual image set and a second virtual image set, the plurality of virtual image sets corresponding to the one input device, each virtual image set having a plurality of virtual images each corresponding to a gameplay operation executable by an input of the one input device, the first virtual image set corresponding to a first set of gameplay operations and the second virtual image set corresponding to a second set of gameplay operations, such that an input of the one input device executes, at a time, one of a gameplay operation of the first set of gameplay operations or a gameplay operation of the second set of gameplay operations, and controlling the image display device to distinguishably display an active set of the virtual images among at least the first virtual image set and the second virtual image set to allow identification of active gameplay operations associated with the corresponding input, wherein only one of the plurality of virtual image sets being activated at a time according to a selection by the player;

receiving, from the player, a selection of the input of the one input device; and executing a gameplay operation corresponding to the selection of the input received in the receiving, the gameplay operation corresponding to the input being different for each of the plurality of virtual image sets, and the gameplay operation corresponding to the active set of the virtual images but not an inactive set of virtual images, wherein each of the virtual images of the plurality of virtual image sets include an image indicative of a gameplay operation that is executable during a gameplay, wherein only one of the plurality of virtual image sets is set as the active set of virtual images at a time by using a switching operation executed by the one input device, and wherein the switching operation is executed during the gameplay.

* * * * *